United States Patent

[11] 3,616,367

| [72] | Inventor | David William Zunker<br>Vienna, W. Va. |
|---|---|---|
| [21] | Appl. No. | 778,827 |
| [22] | Filed | Nov. 25, 1968 |
| [45] | Patented | Oct. 26, 1971 |
| [73] | Assignee | E. I. du Pont de Nemours and Company<br>Wilmington, Del. |

[54] PHOTOPOLYMERIZABLE ACRYLIC COMPOSITIONS CONTAINING REARRANGEABLE ULTRAVIOLET STABILIZER PRECURSORS
8 Claims, No Drawings

[52] U.S. Cl................................................204/159.16,
204/159.23, 260/45.95, 260/885
[51] Int. Cl.......................................................C08f 45/58,
C08g 51/58
[50] Field of Search..........................................260/45.85,
45.95; 204/159.14, 159.23, 159.16

[56] References Cited
UNITED STATES PATENTS

| 2,824,080 | 2/1958 | Haux...................... | 260/45.85 |
| 2,643,985 | 6/1953 | Parker.................... | 260/45.95 |
| 2,632,751 | 3/1953 | Anderson................ | 260/45.95 |
| 2,524,862 | 10/1950 | White..................... | 204/159.16 |
| 2,322,938 | 6/1943 | Howard................... | 260/45.95 |

*Primary Examiner*—Murray Tillman
*Assistant Examiner*—Richard B. Turer
*Attorney*—Earl L. Handley ABSTRACT: A photopolymerizable composition containing monomeric and polymeric esters of an acid selected from the group consisting of acrylic acid and methacrylic acid, 50 to 1,000 parts per million of a photopolymerization initiator, 5 to 100 parts per million of polymerization inhibitor, and 0.001 percent to 5.0 percent of an ultraviolet stabilizer precursor which is a phenolic ester.

PHOTOPOLYMERIZABLE ACRYLIC COMPOSITIONS CONTAINING REARRANGEABLE ULTRAVIOLET STABILIZER PRECURSORS

The invention relates to acrylic photopolymerizable compositions. More particularly this invention relates to acrylic photopolymerizable compositions which polymerize without impedance from their ultraviolet stabilizer precursors which render them resistant to ultraviolet degradation after polymerization.

It is disclosed in U.S. Pat. No. 2,835,649 that unsaturated polyester resin can be blended with resorcinol monobenzoate and monohydroxy and dihydroxy derivatives of benzophenone to produce compositions which are resistant to degradation by ultraviolet radiation. There has been a need, however, for a composition containing both saturated and unsaturated elements which could be further polymerized using photopolymerization without interference from the well-known benzophenone stabilizers which while stabilizing the composition against breakdown from ultraviolet radiation do impede the photopolymerization process. This composition, to be commercially acceptable, would need some form of permanent ultraviolet stabilizer, however.

Therefore, the principal object of this invention is to provide a composition that can be photopolymerized and that is resistant to ultraviolet degradation after polymerization.

A further object of this invention is to provide a composition in which the ultraviolet stabilizer does not impede the photopolymerization.

The composition found fulfills the above objects in that when at least one monomeric alkyl ester of an acid selected from the group consisting of acrylic acid and methacrylic acid is combined with polymer containing alkyl ester polymerized units of an acid selected from the group consisting of acrylic acid and methacrylic acid, a photopolymerization initiator, a polymerization inhibitor and an ultraviolet stabilizer precursor consisting of a phenolic ester, a composition is produced which can be fully photopolymerized without a polymerization rate impedance and yet result in a polymerized composition which has great resistance to ultraviolet degradation.

The invention, then, is a composition containing at least one monomeric alkyl ester of an acid selected from the group consisting of acrylic acid and methacrylic acid, at least one polymer containing alkyl ester polymerized units of an acid selected from the class consisting of acrylic acid and methacrylic acid, a photopolymerization initiator, a polymerization inhibitor, and an ultraviolet stabilizer precursor consisting of a phenolic ester.

Content by weight of the above composition is from 5 to 65 percent polymer, 50 to 1,000 parts per million photopolymerization initiator, 5 to 100 parts per million polymerization inhibitor, 0.001 to 5 percent ultraviolet stabilizer precursor, and a complemental amount of monomer with the preferred content by weight being 35 to 65 percent polymer, 50 to 500 parts per million photopolymerization initiator, 5 to 50 parts per million polymerization inhibitor, 0.01 to 0.5 percent ultraviolet stabilizer precursor, and a complemental amount of monomer.

By stating that at least one monomeric alkyl ester of an acid selected from the group consisting of acrylic and methacrylic acid may be used, it is meant that combinations of the alkyl esters can be utilized as well as singular alkyl esters with the preferred esters being methyl methacrylate, ethyl methylacrylate, ethyl acrylate, and ethylene glycol dimethacrylate. The polymer containing alkyl ester polymerized units of an acid selected from the class consisting of acrylic and methacrylic acid refers to the polymeric forms of the above preferred alkyl esters and copolymers thereof.

A photopolymerization initiator is included in the composition to promote the commencement of photopolymerization at desired time or time when the composition is subject to ultraviolet irradiation. Photopolymerization initiators include benzoin, benzoin ethyl ether, α-methyl benzoin, benzil, α, α-di-bromoacetophenone, desyl chloride, and 2,2'-azo-bis-isobutyronitrile.

To facilitate polymerization at the desired time and not prior to the desired time, a polymerization inhibitor is included in the composition. Polymerization inhibitors include 2,3-dimethyl-6-t-butyl phenol, hydroquinone, hydroquinone monomethyl ether, 2,5-di-t-butyl hydroquinone, and 2,6-di-t-butyl-4-methyl phenol.

The ultraviolet stabilizer precursor in the composition allows the composition to be photopolymerized without being inhibited as would be the case with the previously mentioned benzophenones. However, the ultraviolet stabilizer precursor rearranges through the Fries rearrangement to hydroxybenzophenones after polymerization and through exposure to sunlight. The newly formed hydroxybenzophenones then give the polymerized composition stability with regard to degradation from ultraviolet radiation. Compounds which can undergo the Fries rearrangement and form the necessary benzophenone derivitives are phenolic esters having the formula

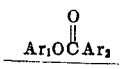

where $Ar_1$ and $Ar_2$ are selected from the group consisting of monohydroxy, dihydroxy, monoalkoxy, and dialkoxy substituted aryl groups, and these substituted aryl groups may be further substituted with a group selected from the class of alkyl, aryl, carboxyl, and carboxylic ester groups. Preferred phenolic esters include resorcinol monobenzoate, phenyl salicylate, and p-octylphenyl salicylate.

The composition has particular application in a continuous acrylic sheet-producing process where the composition is pumped to an extruder where it is heated and extruded under pressure through a sheeting die. After the sheet leaves the die, it travels vertically between fluorescent black light lamps which produce the ultraviolet light necessary for polymerization of the sheet and between heaters. The ultraviolet light induced polymerization causes the composition to harden and the hardened polymerized sheet is then removed from the polymerization tower by pinch rolls. The process is more fully described in application Ser. No. 618,046, filed Feb. 23, 1967. Production of the sheet is not slowed by long holding times in the polymerization tower resulting from polymerization rate impedance because the ultraviolet stabilizer precursor does not cause a polymerization rate impedance as heretofore used stabilizers do. However, after exposure to sunlight the ultraviolet stabilizer precursor rearranges to said hydroxybenzophenones which provide the requisite ultraviolet stabilization in the sheet.

The following examples give evidence for the benefits of the improved composition over previously used and control compositions. These examples illustrate but do not limit the invention, all parts and percentages being by weight unless otherwise specified.

EXAMPLE I

A sufficient quantity of composition F of table 1 was prepared by blending together the following compounds in their respective proportions: methyl methacrylate monomer, 56.7; methyl methacrylate polymer, 43.3; benzoin, 0.01; 2,4-dimethyl-6-t-butyl phenol, 0.003; resorcinol monobenzoate, 0.03. The composition was stirred and agitated to remove dissolved gases until its viscosity approached the point at which the composition would no longer be flowing. At this point the composition was poured into a cell formed by two 12×12-inch glass plates separated by a ⅛-inch thick polyvinyl chloride gasket. The cell was then stored in darkness for one day to allow the composition to completely gell. A thermocouple was inserted into the cell and the cell was suspended in an air circulating oven and irradiated by two banks of black light fluorescent bulbs. The banks of fluorescent bulbs consisted of five 20-watt lamps each with each lamp being 24 inches long. Distance between the two banks was 1 foot.

The time necessary for the temperature in the composition to reach its highest point due to the exothermic polymerization reaction was recorded along with both the beginning and ending temperatures. With composition F of table I the temperature increased from 60° to 78° C. in 24 minutes. The rate of polymerization is proportional to the temperature rise divided by the time necessary for that temperature rise. For composition F in table I this ratio was 0.75° C./minute.

methacrylate monomer, 58; methyl methacrylate polymer, 42; benzoin, 0.010; 2,4-dimethyl-6-t-butyl phenol, 0.0005; phenyl salicylate, 0.2.

The polymerization of this composition produced a temperature rise as defined in example I of 90°–101° C. in 22 minutes, thereby presenting a ratio of 0.95° C./min. which is proportional to the polymerization rate. This rate compares favorably with the rates shown in example I for the control

TABLE I

| Composition | Composition, weight, parts | | | | | Temp. rise (° C.)* | Time* (min.) | Temp. rise (° C.)*/time (min.) | Yellowness | |
|---|---|---|---|---|---|---|---|---|---|---|
| | Monomer | Polymer | Benzoin | Inhibitor | Additive | | | | Init. | 2 wks.** |
| A | 56.7 | 43.3 | 0.01 | 0.003 | None | 60–80 | 23 | 0.87 | 0.2 | 4.5 |
| B | 56.7 | 43.3 | 0.02 | 0.003 | None | 60–82 | 16 | 1.37 | 0.2 | 4.7 |
| C | 56.7 | 43.3 | 0.01 | 0.003 | ¹ 0.03 | 60–70 | 51 | 0.196 | 0.3 | 1.1 |
| D | 56.7 | 43.3 | 0.02 | 0.003 | ¹ 0.05 | 60–70 | 44 | 0.227 | 0.3 | 1.3 |
| E | 56.7 | 43.3 | 0.01 | 0.003 | ² 0.03 | 60–64 | 144 | 0.028 | 0.3 | 1.5 |
| F*** | 56.7 | 43.3 | 0.01 | 0.003 | ³ 0.03 | 60–78 | 24 | 0.75 | 0.1 | 1.6 |
| G*** | 56.7 | 43.3 | 0.02 | 0.003 | ³ 0.05 | 60–81 | 19 | 1.10 | 0.1 | 1.7 |
| H*** | 56.7 | 43.3 | 0.02 | 0.003 | ³ 0.10 | 60–83 | 21 | 1.09 | 0.1 | 1.9 |

¹ 2,4-dihydroxybenzophenone.
² 2,-2'-hydroxy-5-methylphenyl)benzotriazole.
³ Resorcinol monobenzoate.

*Rate of temperature rise during the exotherm is proportional to polymerization rate.
**After 2 weeks' accelerated weathering, Compositions A and B had a distinct yellow cast, while Compositions C through H were practically colorless.
***Improved compositions.

After the temperature within the composition had reached its highest value due to the exothermic polymerization reaction, the oven temperature was increased to 118° C. and maintained at this level for 69 minutes to facilitate the complete polymerization of the sheet within the cell.

After cooling, the sheet was separated from the glass plates and exposed to ultraviolet irradiation in an accelerated weathering test. The test consisted of exposure of the sample at 40° C. between two FS–20 sunlamp fluorescent bulbs separated by 2 inches for a period of 2 weeks. Visible light transmission through the sheet was measured both before and after exposure by means of a Hunter Associates Color and Color Difference Meter. For both the fresh sheet and the sheet after 2 weeks exposure, a yellowness index ($yi$) was calculated using the following equation;

$$YI = 100 \left( \frac{T640 \text{ m}\mu - T450 \text{ m}\mu}{T560 \text{ m}\mu} \right)$$

where $T$ is the light transmitted at the indicated wavelengths. In the case of composition F in table I, the yellowness or $i$ was initially 0.1 and after the 2 week exposure time it was 1.6.

Composition F in table I is exemplary of the improved composition as are compositions G and H of table I. These, in comparison to the control compositions or compositions A and B, produce approximately the same polymerization rate but show far superior resistance to yellowness or degradation from ultraviolet radiation.

The improved compositions also produce superior results when compared to compositions containing the well-known ultraviolet stabilizers (compositions C, D and E) in that, the improved compositions show polymerization rates approximately equal to control whereas the compositions containing the well-known ultraviolet stabilizers present rates vastly smaller than control. The resistance to ultraviolet degradation or yellowing, however, is similar between the improved compositions and the compositions containing the well-known stabilizers.

All the compositions presented in table I were blended, produced and tested as described above for composition F of table I. Further, all compositions of table I contained methyl methacrylate monomer, methyl methacrylate polymer, benzoin (photopolymerization initiator), and 2,4-dimethyl-6-t-butylphenol (polymerization inhibitor) in the presented proportions plus their specific additive or no additive, as the case may be.

EXAMPLE II

Following the procedure described in example I, a composition containing the following compounds at their respective proportions was blended, polymerized, and tested: methyl compositions (A & B) and compositions F, G and H which also contained an ultraviolet stabilizer precursor. The composition resistance to yellowness or degradation from ultraviolet irradiation factor $yi$ was 2.5 after 2-weeks' exposure. Thus, it compared favorably with both the other ultraviolet stabilizer precursor containing compositions of example I (F, G and H of table I) and the compositions containing the well-known ultraviolet stabilizers (C, D and E of table I). Therefore, this composition while containing a different ultraviolet stabilizer precursor than F, G and H of table I, produced comparable results.

EXAMPLE III 45 grams of polymethyl methacrylate, 255 grams of methyl methacrylate monomer, 0.003 gram of 2,4-dimethyl-6-t-butyl phenol inhibitor, 0.2 gram of resorcinol monobenzoate, and 0.18 gram of 2,2'-azo-bis-isobutyronitrile were combined as described in example I to 99 percent conversion. The prepared sheet was then exposed to outdoors sunlight. Comparison of the ultraviolet spectral scan of samples before and after 1½-days' exposure showed an increase in absorption in the 2,800 to 3,700 A. region corresponding to essentially complete conversion of the resorcinol monobenzoate to 2,4-dihydroxybenzophenone.

I claim:

1. A photopolymerizable composition containing at least one monomeric alkyl ester of an acid selected from the group consisting of acrylic acid and methacrylic acid, at least one polymer containing alkyl ester polymerized units of an acid selected from the group consisting of acrylic acid and methacrylic acid, a photopolymerization initiator, a polymerization inhibitor, and 0.001 to 5 percent by weight resorcinol monobenzoate.

2. The composition in claim 1 in which the monomeric alkyl ester of an acid is selected from the group consisting of methyl methacrylate, ethyl methacrylate, ethyl acrylate, and ethylene glycol dimethacrylate and in which the polymer containing alkyl ester polymerized units of an acid is selected from the group consisting of methyl methacrylate, ethyl methacrylate, ethyl acrylate, ethylene glycol dimethacrylate and copolymers thereof.

3. The composition in claim 2 in which the photopolymerization initiator is selected from the class consisting of benzoin, benzoin ethyl ether, α-methyl benzoin, benzil, α,α-dibromoacetophenone, desyl chloride, and 2,2'-azo-bis-isobutyronitrile.

4. The composition in claim 3 in which the polymerization inhibitor is selected from the class consisting of 2,4-dimethyl-6-t-butyl phenol, hydroquinone, hydroquinone monomethyl ether, 2,5-di-t-butyl hydroquinone, and 2,6-di-t-butyl-4-methyl phenol.

5. The composition in claim 4 in which the content by weight of the composition is from 50 to 1,000 parts per million photopolymerization initiator.

6. The composition in claim 5 in which the content by weight of the composition is from 50 to 100 parts per million polymerization inhibitor.

7. The composition in claim 6 in which the content by weight of the composition is from 5 to 65 percent polymer.

8. A photopolymerizable composition containing 35 to 65 percent by weight methyl methacrylate polymer, 50 to 500 parts per million by weight benzoin, 5 to 50 parts per million by weight 2,4-dimethyl-6-t-butyl phenol, 0.01 to 0.5 percent by weight resorcinol monobenzoate, and a complemental amount of methyl methacrylate monomer.

* * * * *

PO-1050
(5/69)

UNITED STATES PATENT OFFICE
CERTIFICATE OF CORRECTION

Patent No. 3,616,367      Dated October 26, 1971

Inventor(s) DAVID WILLIAM ZUNKER

It is certified that error appears in the above-identified patent and that said Letters Patent are hereby corrected as shown below:

Claim 6, line 2 - instead of "50 to 100 parts", it should read -- 5 to 100 parts --.

Signed and sealed this 11th day of July 1972.

(SEAL)
Attest:

EDWARD M.FLETCHER, JR.
Attesting Officer

ROBERT GOTTSCHALK
Commissioner of Patents